W. A. LEGATE.
DRILLING BIT.
APPLICATION FILED MAY 5, 1921.

1,429,041.

Patented Sept. 12, 1922.
2 SHEETS—SHEET 1.

Inventor
W. A. Legate
By C. A. Snow & Co.
Attorneys.

W. A. LEGATE.
DRILLING BIT.
APPLICATION FILED MAY 5, 1921.

1,429,041.

Patented Sept. 12, 1922.
2 SHEETS—SHEET 2.

Inventor
W. A. Legate
By C. A. Snow & Co.
Attorneys

Patented Sept. 12, 1922.  1,429,041

UNITED STATES PATENT OFFICE.

WILLIAM A. LEGATE, OF GUTHRIE, OKLAHOMA, ASSIGNOR OF ONE-HALF TO GARNET C. SANDIDGE AND CHESTER R. DAMON, BOTH OF GUTHRIE, OKLAHOMA.

DRILLING BIT.

Application filed May 5, 1921. Serial No. 466,925.

*To all whom it may concern:*

Be it known that I, WILLIAM A. LEGATE, a citizen of the United States, residing at Guthrie, in the county of Logan and State of Oklahoma, have invented a new and useful Drilling Bit, of which the following is a specification.

The device forming the subject matter of this application is a bit of the sort used in well drilling operations wherein both a longitudinal movement and a rotary movement are imparted to the bit.

The invention aims to provide a bit, the cutters of which may be renewed readily, at will, to provide a bit which may be of any desired length, it being possible to take off parts of the bit, and to improve generally, and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
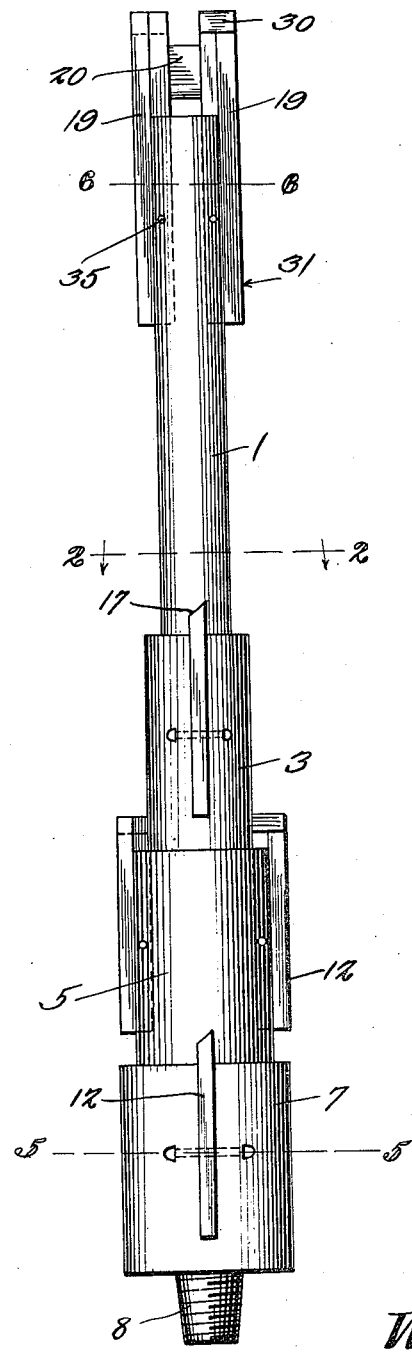
Figure 2:
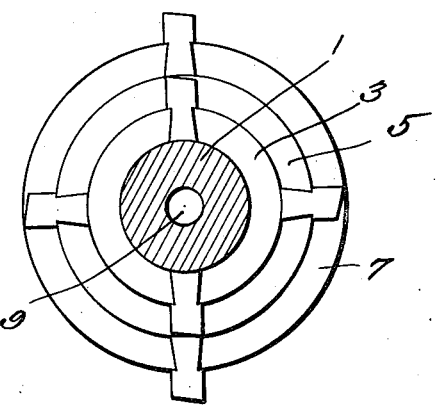
Figure 3:
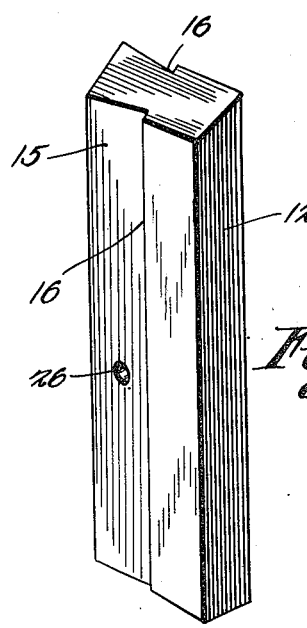
Figure 4:
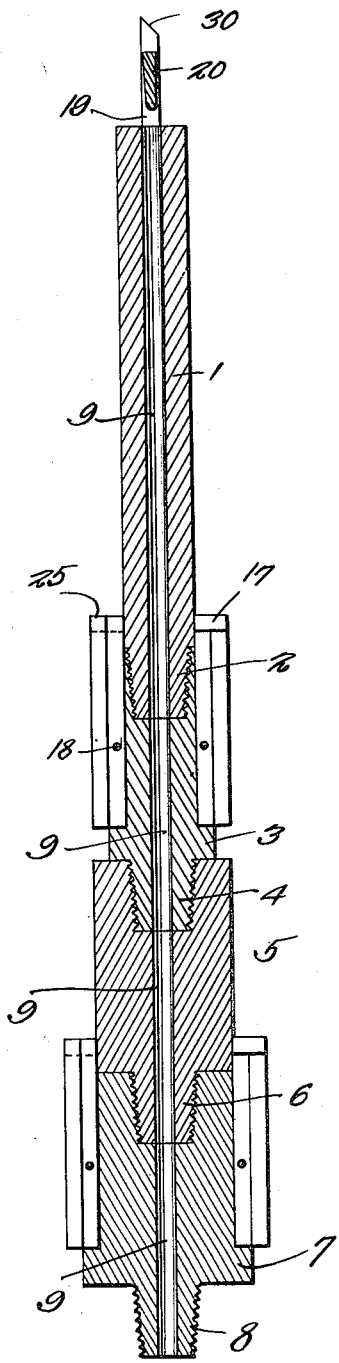
Figure 5:
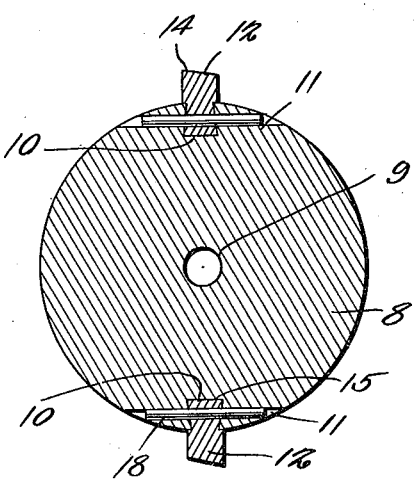
Figure 6:
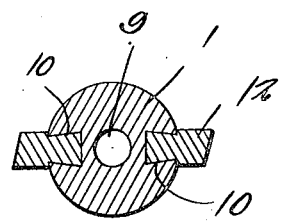

Figure 1 shows in side elevation, a device constructed in accordance with the invention; Figure 2 is a cross section on the line 2—2 of Figure 1; Figure 3 is a perspective view disclosing one of the cutters; Figure 4 is a longitudinal section of the bit; Figure 5 is a cross section on the line 5—5 of Figure 1; Figure 6 is a cross section on the line 6—6 of Figure 1.

The bit embodies a shank 1 having a tapered end 2 threaded into a head 3 having a tapered end 4 threaded into a head 5, the head 5 being supplied with a tapered end 6 threaded into a head 7, the head 7 having a stem 8 which may be connected to any suitable means for operating the bit. The head 7 is of greater diameter than the head 5, the head 5 is of greater diameter than the head 3, and the head 3 is of greater diameter than the shank 1. The shank 1, the head 3, the head 5 and the head 7 are provided with cooperating bores 9 defining an opening through which water may be fed, if desired, in accordance with the well known practice of drillers. There may be as many or as few of the heads as desired, and, thus, the tool may be of any convenient length, the number of cutters being increased or decreased accordingly.

Longitudinal seats are formed in the shank 1 and in the heads 3, 5 and 7, the seats being noted by the numeral 10, and being of dovetailed construction. The seats 10 extend through one end of the parts wherein they are formed. The shank 1 and the heads are supplied with transverse openings 11 communicating with the seats 10.

Cutters are provided, one cutter being shown in perspective in Figure 3. The cutters include, each, a body 12 having a side cutting edge 14, a wing 15 projecting from the body. The wing 15 is shaped to fit in the seat 10 and defines shoulders 16 which bear against the outer surface of the parts 7, 5 and 3, the strength of the mounting of the cutters being increased accordingly. It is to be observed that the cutters on the head 7 overlap the head 5, the cutters on the head 5 overlapping the head 3, and the cutters on the head 3 overlapping the shank 1. Owing to this construction, the tool is reinforced where one part thereof is joined to another, that is, for instance, where the shank 1 is threaded at 2 into the head 3. The cutters above described are supplied with end cutting edges 25. Securing elements 18 are mounted in the transverse openings 11 and hold the cutters in place, the wings 15 of the cutters having openings 26 for the reception of the securing elements 18.

Cutters 19 on the shank 1 are constructed like the cutters 14 and have end cutting edges 30 and side cutting edges 31, the cutters 19 being united, for reinforcement, by a cross piece 20 located beyond the end of the shank 1. The cutters 19 are held on the shank by securing elements 35, having the function of the parts 18. The cutters 19 and the cutters on the head 5 preferably are alined longitudinally of the tool, the cutters on the head 3 and the cutters on the head 7 being alined, and being located ninety degrees remote from the cutters 19 and the cutters on the head 5.

It will be clear that any of the cutters may be removed upon occasion, and that the head, together with their cutters, may be detached, thereby lengthening or shortening the tool and increasing the effective diameter of the tool, so that a comparatively large hole or a relatively small hole may be made.

What is claimed is:—

1. A device of the class described comprising parts of successively decreasing diameters, and provided with longitudinal seats which open laterally through said parts and through the ends thereof; cutters insertable endwise into the seats and dove-tailed therein against outward movement in a direction at right angles to the axis of the device, the cutters projecting beyond the ends of said parts and projecting laterally beyond said parts; and means for holding the cutters against longitudinal movement.

2. A tool of the class described comprising parts of successively decreasing diameters, said parts being provided with longitudinal seats; and cutters detachably held in the seats and projecting beyond the ends of the said parts, the cutter on each part bearing against the side of the next adjoining part.

3. A tool of the class described comprising a shank and a head, the shank being of less diameter than the head; a cutter carried by the head and extended longitudinally of the shank; and an H-shaped cutter, the shank being provided in its end with longitudinal seats wherein parts of the H-shaped cutter are received.

In testimony that I claim the foregoing as my own, I have hereto affixed my signature in the presence of two witnesses.

WILLIAM A. LEGATE.

Witnesses:
LYMAN J. GRAY,
CHRISTINE FUHRING.